Oct. 13, 1953

S. M. BAGNO 2,655,645

METHOD AND APPARATUS FOR DETECTING MOTION IN A CONFINED SPACE

Filed Sept. 26, 1947

INVENTOR
SAMUEL M. BAGNO
BY
James ward Franklin
ATTORNEY

Patented Oct. 13, 1953

2,655,645

UNITED STATES PATENT OFFICE 2,655,645

METHOD AND APPARATUS FOR DETECTING MOTION IN A CONFINED SPACE

Samuel M. Bagno, Astoria, N. Y., assignor to Alertronic Corporation, a corporation of New York Application September 26, 1947, Serial No. 776,368

25 Claims. (Cl. 340—227)

1

The present invention relates to a method for detecting motion in a confined space and to apparatus which may be used to effectuate said method, and more specifically relates to the use of high frequency sound vibrations to detect either motion of an intruder or acceleration of the air in said confined space and for operating an alarm in response to the detection of any undesired motion or acceleration.

This method and apparatus is particularly adapted for use as an intruder or burglar alarm, but it can equally as well be used as a fire alarm, or to give a warning that a window has been broken.

The use of supersonic or near supersonic frequencies which, when reflected, set off a sensible alarm to give notice that an object is in the path of the transmitted vibrations is well known, and is used particularly in the field of submarine detection. A system for utilizing vibrations of this type for the detection of disturbances in a confined space has also been proposed, as exemplified in Patent No. 2,071,933. The system there disclosed is, however, unworkable from a practical point of view, since detection is accomplished by setting up a standing wave condition in the confined space and by placing the microphone so that it is at a null point in said standing wave system. Any disarrangement of the articles in the room which reflect the transmitted supersonic waves will cause a shift in the null point and consequently a large increase in the energy received by the microphone, thus setting off a sensible alarm. Such a system is so delicate that, if any false alarms are not to be had, the air in the room must be approximately still, the temperature thereof must not change and each and every article in the room must always be placed in exactly the same position, lest the standing wave pattern be shifted. While theoretically such a system is workable, from a practical point of view it is impossible to so control the condition of the confined space as to make said system practical. So sensitive is that system that no means are or can be provided for varying the detection capabilities of the system so as to exclude the detection of normal variations in the condition of the confined space.

Another important drawback to the null point method of detection is that if the null point shifts its position slightly so that the microphone is located slightly off the null position but not enough off so that it will indicate the presence of an intruder, should the null point again shift its position so that it passes from one side of the

2 microphone to the other, a sharp signal will be created in the detector which can be mistaken by it for the intruder signal, thus giving rise to many false alarms. From a practical point of view, such minimal shifts of the null point cannot be prevented and consequently, for both of the above reasons, the null point method of detection is unworkable.

It is the prime object of the present invention to provide a method and apparatus for detecting disturbances in a confined space which employs high frequency sound vibrations and which is not subject to the above defects.

It is a further object of the present invention to provide such a method and apparatus which is so designed as to render normal variations in the condition of the confined space non-detectable and at the same time render abnormal variations thereof detectable. As a corollary object, the method and apparatus of the present invention is so designed as to be adjustable at will within limits so as to control both the magnitude and the degree of the disturbance which is detectable.

Yet another object of the present invention is to devise such a method and apparatus which operates on the Doppler principle, that is to say, which detects disturbances by reason of the fact that said disturbances so modify a portion of the transmitted vibrations as to alter their effective frequency. This object is accomplished by transmitting vibrations of a predetermined supersonic or near supersonic frequency into the confined space, said vibrations being reflected from the various objects in the room, in receiving the reflected vibrations and in comparing the frequencies thereof with the frequencies of the original transmitted vibrations.

It is a further object of the present invention to devise such a method and apparatus which operates independently of the positioning of the various objects in the confined space, so that it is not necessary that all of those objects be positioned in exactly the proper places in order to achieve efficient detection. The objects in the room may be added to, removed, or placed anywhere at all prior to setting the detection apparatus into operation without in any way affecting the operation thereof. A corollary object is to provide a detection method and apparatus the operative parts of which may be fixed in position in the room and thus become a part of the permanent installation thereof, it being wholly unnecessary to shift the position of the same to conform to the room furnishings.

A still further object of the present invention is to devise a method and apparatus employing two separate but related frequencies of transmission so as to eliminate the effect of standing wave pattern on the detection capabilities of the equipment.

It is another object of the present invention to devise a method and apparatus which will eliminate the effect of standing wave pattern on the detection capabilities of the equipment by employing but a single transmitter regeneratively connected to the receiver so as to ensure that the transmitted frequency is such that the receiver is not at the null point thereof.

Yet another object is to provide an improved design for the electrical circuits employed in said apparatus so as to enhance the detection capabilities thereof.

A still further object of the present invention is to so design the electrical circuits as to set off the sensible alarm whenever the detecting apparatus fails so that reliance may not be placed on a non-operating system.

Yet another object is to so connect the detecting apparatus with a main power source and with an auxiliary power source that, upon failure of the main power source, the apparatus is automatically connected to the auxiliary power source without setting off the alarm, and so that, upon failure of the auxiliary power source as well, the alarm is set off.

Yet another object is to so design the electrical circuits involved as to render the outputs thereof which control the sensible signal substantially independent of the variations in the source voltage.

It is a further object to so modify and improve the circuit arrangement as to prevent chance shock waves from giving rise to a false alarm.

To the accomplishment of the foregoing objects and such other objects as may hereinafter appear, the present invention relates to a method and apparatus for detecting disturbances in a confined area and to various details and design of said apparatus as defined in the appended claims and as set forth in this specification, taken together with the accompanying drawings, in which:

Figure 1:
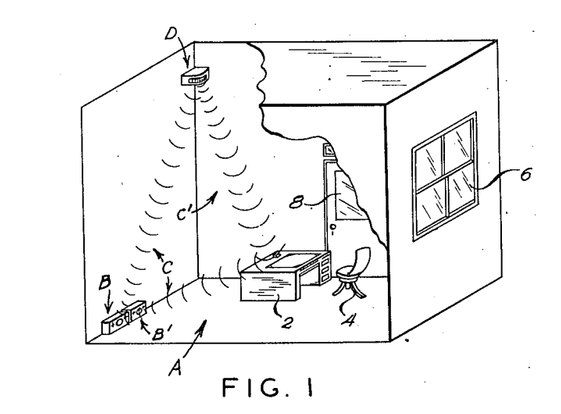
Fig. 1 is a schematic representation of a confined space such as a room which is equipped with the apparatus of the present invention.

Since one of the most important varieties of use of the present invention is as a burglar or fire alarm, the illustration of Fig. 1 shows the manner of employment of my method and apparatus in such an application. In a confined space such as a room A, some of the walls of which are broken away in Fig. 1 to show the interior thereof, one or more transmitters B are positioned so as to transmit vibration designated by the curved lines C into the room A. The frequency of these vibrations is preferably chosen to be somewhat higher than the range of frequencies audible to the human ear so that the operation of the equipment will be unknown to the would-be intruder and so that it will not interfere with the sensibilities of passers-by or those working adjacent to the room in which the apparatus is functioning. The contents of the room, here illustrated as a desk 2 and a chair 4, and the walls thereof will reflect the vibrations C, these reas to transmit vibration designated by the curved lines C'. For purposes of illustration, these reflections are shown as coming only from the desk 2, but it will be understood that the entire room A is filled both with the transmitted vibrations C and the reflected vibrations C'. A microphone D capable of receiving vibrations of the frequencies involved and converting those vibrations into corresponding electrical fluctuations is also mounted in the room, and is so positioned as to receive not only the reflected vibrations C' but the transmitted vibrations C. Since reflection takes place from all of the walls of the room, and since therefore, reflected waves are travelling in all directions, these reflected waves eventually, after repeated reflections and redeflections reaching the microphone D, the direction of motion which the apparatus will detect is not critical. No matter in what direction the intruder moves or the air accelerates, it will change the effective frequency of some waves and thus will eventually control the alarm. If the room is undisturbed, that is to say, if the contents thereof remain stationary, if the air therein is not accelerated, and if nothing moves in the room, the frequency of the reflected waves C' will be equal to the frequency of the transmitted waves C. On the other hand, if there be a disturbance in the room, the waves C' which are reflected by the thing in motion will differ in frequency from the transmitted waves C insofar as the microphone D is concerned. Thus, if the desk 2 be moved toward the microphone D, the waves reflected therefrom will impinge upon the microphone D at a faster rate than if the desk 2 were stationary, or if the desk 2 be moved away from the microphone D, the waves C' reflected therefrom will impinge upon the microphone D at a slower rate. The difference in frequency between transmitted waves C and the reflected waves C' will therefore depend upon the speed with which the desk 2 is moved. Should a person enter the room, he, too, would reflect the transmitted waves C, and should he move, the waves C' reflected by him would appear to the microphone D as having a frequency different from that of the transmitted waves C. This effect is well known and is termed the "Doppler effect" in the literature.

Since the transmitted waves C must pass through the air in the room A, the condition of the air must also be taken into account. If the air is in motion and accelerating, the transmitted waves C carried thereby will, when they impinge upon the microphone D, have an apparent frequency equal to the transmitted frequency as modified by the motion of the air. Because of the fact that the transmitted waves C will reach the microphone by diverse routes, some of the waves travelling directly thereto (see the vertical wave train of Fig. 1) and other of the wave trains C reaching the microphone by a more diverse route (see the reflected wave train C' of Fig. 1), an effective difference in frequency will be detected by the microphone.

Thus, if the window 6 or the door 8 of the room A be opened and if a draft enter therein, the air in the room A will be accelerated and thus the microphone D will detect frequency differences. Moreover, if any portion of the room be subjected to undue thermal distrubances, the air in the vicinity of those thermal disturbances will have considerable turbulence, naturally accompanied by acceleration. The motion of that portion of the air will so affect the transmitted waves C passing therethrough that when those waves are reflected and finally reach the microphone D, the microphone will detect a frequency difference.

It will therefore be apparent that the method and apparatus of the present invention will be effective not only in detecting any motion of an intruder within the room A but will also be effective to detect any excessive air acceleration such as might be caused by a broken window or by undue thermal disturbance such as fire.

A certain amount of thermal distrubance in a room, and consequently a certain amount of air turbulence connected therewith, must be allowed for. If the room has a radiator and the radiator is in operation, air turbulence and acceleration will be present and it is necessary that any workable alarm system be so designed as not to be set off by such normal turbulence, the alarm only being soundable when the thermal disturbance exceeds the normal amount.

It is therefore appropriate to analyze briefly the theoretical limitations which are necessarily placed upon equipment of this nature in order to illustrate how the method and apparatus of my invention is rendered practical, that is to say, is capable of detecting excessive disturbances and at the same time is incapable of detecting normal disturbances.

*Theoretical considerations*

The normal disturbances which should not be capable of setting off the alarm may be considered as (1) the noise level of the microphone-amplifier system itself, and (2) the noise level of normal temperature variations in the room. If a microphone and an amplifier be properly designed, the minimum sound that can be picked up thereby which will exceed the inherent noise level thereof is $3 \times 10^{-3}$ dynes per sq. centimeter (Pender & McIlwain, Electrical Engineering Handbook, pp. 12-04, 9-05). A sound pressure of $2 \times 10^{-4}$ dynes per sq. centimeter corresponds to $10^{-16}$ watts per sq. centimeter and consequently an energy input of $2.25 \times 10^{-14}$ watts per sq. centimeter is the minimum energy input which can be detected by a microphone and amplifier properly designed. The noise due to normal temperature fluctuations has been determined to be $10^{-17}$ watts per sq. centimeter (Sivian & White, Journal Acous. Soc., April 1933, p. 288). Since this is of an order materially lower than the minimum detectable sound, it will not affect the operation of the equipment.

There are other temperature effects which may show up as noise in this system. One such effect arises from the fact that the velocity of sound through air changes with the temperature thereof at a rate of about .2% per degree centigrade. If, as is preferable, the transmitted frequencies be on the order of between 17 and 20 kc., that is to say, in the supersonic or near supersonic range, there will be in a 20 foot enclosure approximately 300 wave lengths of 18 kc. sound along the length of the enclosure. If the temperature of the air goes up 1½ degrees, the number of wave lengths in that enclosure would decrease by 1. While the temperature is changing, the frequency that the microphone detects will therefore appear to change, and if the temperature varied as much as 1½ degrees per second, the received frequency would be changed 1 cycle per second from the transmitted frequency. Consequently, a frequency difference could be detected. A rate of change of temperature of 1½ degrees per second is, however, very hard to obtain, and a direct flame or a radiator operating at excessive heat would be necessary to change the temperature of the air at such a rate.

There is a secondary effect due to temperature change which causes slight disturbances. This is the effect of air turbulence set up by a convection current in the air. This current comes about because the air that is heated rises, cools off, and falls again. If the heating is continuous, this may cause a continuous current of air to flow. This flowing air, while accelerating, will cause a variation in the effective frequency of the transmitted waves C passing through it. When the air is accelerating, the effect is that of decreasing the distance between transmitter to receiver in the case where the air is moved from transmitter to receiver and increasing the distance when the air is returning from receiver to transmitter. This is because the wave length is longer in air that is moving away from the transmitter and there are less waves between transmitter and receiver, whereas the reverse is true in the case of air moving toward the transmitter. In the same 20 foot enclosure previously considered, a change of 1½ wave lengths in 300 is a change of .5%. This is equivalent to air moving at .5% of the speed of sound or approximately 5 feet per second. Therefore, in order to produce a change of 1½ wave lengths in the effective frequency of the wave train, the air whirling about the room must accelerate five feet per second per second. Since the air may move both ways, this means that for such an acceleration there will be a minimum perceptible frequency difference detected by the microphone D on the order of 3 cycles per second. An acceleration of air on this order would require approximately 1 pound of force per square foot continually applied. Such an acceleration could come about if the room were open, that is to say, if the window 6 or the door 8 were open. If this air acceleration were due to a density change caused by heat, the heat would have to be more than that of boiling water in order to exert sufficient force.

The whirling air would have another effect, caused by the reflections derived from the changing density of the air. This effect is however negligible.

It therefore appears that if air turbulence, short of that caused by direct flame, by a highly overheated radiator, or by the breaking or opening of a window or door, be considered, the maximum frequency difference caused thereby would be approximately 3 cycles per second if the transmitted frequency is on the order of 18 kc. per second.

At 20 kc. per second the wave length is approximately ⅔ of an inch. Motion of a reflecting object would have to be at the rate of 2 inches per second in order to give an effective frequency change of 3 cycles per second. Consequently, the minimum detectable speed of motion which my system will theoretically detect, without setting off an alarm for normal disturbances, would be a speed of 2 inches per second, which is a very slow speed indeed. The maximum detectable speed of motion is much more a matter of choice, the primary controlling consideration being that the frequency change caused by the maximum detectable speed should be sufficiently different from the transmitted frequency so that no difficulty will be encountered in differentiating between the two in the detection step. If a maximum speed of 120 inches per second be hypothecated, the frequency difference caused thereby will be 180 cycles per second which is so much below the transmitted frequency of approximately 18 kc. per second as to render circuit design uncritical. A speed of motion exceeding 120 inches per second would be hard indeed for an intruder to attain.

The above limits are set forth by way of exemplification only. The upper limit may be extended greatly beyond the specific figure set forth without materially complicating the task of circuit design. The lower limit may be decreased but at the risk of having the alarm set off by a disturbance which may be considered normal. In a closed space where temperature is closely controlled, the minimum detectable frequency may be decreased greatly below the value set forth above, in which case my system can be employed not only as an intruder or fire alarm but also as an indicator of undesired thermal changes. As will become apparent in the detailed circuit analysis to follow, an adjustment is provided in my apparatus so that the minimum detectable frequency may be adjusted at will to allow for variations in all the factors above discussed. Consequently, my apparatus is rendered exceedingly flexible in use and at the same time may be rendered as sensitive and as positive as desired.

Thus far the theoretical discussion has dealt with the sensitivity of the apparatus to frequencies. It is also necessary to consider its sensitivity to amplitudes. If we assume a room 100 feet by 100 feet by 20 feet and a transmitter which radiates 100 milliwatts of energy and if we further assume that the intruder whose presence we wish to detect has a surface area of 3 square feet, we find that the sound amplitude is quite sufficient for efficient detection. This may be proved by the following argument. A speaker radiating from a corner of a room radiates approximately 8 times the energy density that it would if it were free to radiate in all directions. At 100 feet from the speaker, the sound energy would be $6.35 \times 10^{-6}$ K watts per sq. ft. where K is the radiation density increase due to surface reflections (this is computed from the formula $$\frac{8WK}{4\pi R^2}$$

where W represents the watt radiation by the speaker and R is the distance from the speaker to the intruder). Since the intruder has a surface area of 3 sq. ft., he would radiate $1.9 \times 10^{-5}$ K watts. The energy received by the microphone would therefore be $1.66 \times 10^{-13}$ K² watts per sq. cm. Since we have previously determined that $2.25 \times 10^{-14}$ watts per sq. cm. is the minimum energy detectable by a microphone and amplifier, it will be apparent that a 3 sq. ft. intruder would reflect sufficient energy to cause the apparatus to sound the alarm. Since K² is generally on the order of 10, the energy received due to an intruder is theoretically 100 times the minimum sound intensity that a microphone can receive. Consequently, in a room of the size described, and with a speaker radiating energy as described, motion of an object having a surface area of .03 sq. ft. would theoretically be detectable.

As will become apparent when the detailed circuit analysis is set forth, I provide in my system for a manually adjustable control whereby the minimum detectable amplitude may be regulated, and this independently of the minimum detectable frequency change. I have on actual tests made my apparatus so sensitive that motion of a finger alone would be detectable and I have also made it so insensitive that, for example, motion of an entire arm could not be detected.

By providing these two adjustments, I enable my apparatus to be variable so as to avoid the detection of desired degrees of turbulence by adjusting the minimum detectable frequency thereof and adjustable to vary the minimum detectable intruder size by adjusting the minimum detectable amplitude thereof. The latter adjustment is extremely important in order that, if desired, such intruders as rats or mice, or such regular occupants as cats and dogs would not be detectable, whereas an intruder of human size would be.

*Avoidance of null points*

I have found that occasionally the placing of objects in the room sets up such a standing wave pattern that the microphone D is located at a null point. As has already been mentioned, this furnishes the basis for detection in Patent No. 2,071,933. I have found that in a practical system, not only is such an arrangement not desirable, but it must be avoided at all costs lest, in the event of such an accidental set up, the detecting apparatus may be rendered overly sensitive. Since it may often be impractical, particularly in warehouses or the like, to shift the position of the contents thereof to conform to the peculiarities of the intruder detection apparatus, and since normal variations in the thermal condition of the room may cause the null point of the standing wave pattern to shift to the microphone position at any time, it is essential that means be provided to eliminate this possibility.

Figure 9:
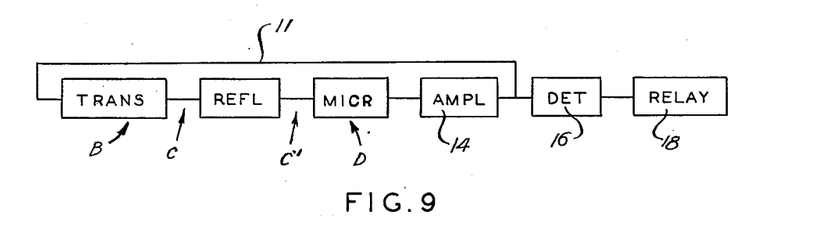
Fig. 9 is a block diagram illustrating the broad steps inherent in the method of the present invention when only a single transmitter is employed.

To this end, I so relate the transmitting and receiving elements B and D as to ensure that reception never takes place at a null point of a standing wave pattern. This relation may take the form, as illustrated in Fig. 2, of employing a pair of transmitters each operating at a different frequency or, as illustrated in Fig. 9, I may connect the transmitter B and the microphone D in regenerative fashion, the air space between them constituting an oscillatory chamber and the transmitter B and the microphone D having natural resonant frequencies in the range within which transmission is desired, so that whatever the conditions in the confined space may be, generation of frequencies of vibration such that the microphone D is never at a null point will ensue.

Each of these methods will now be described in detail.

I have discovered, as one means of avoiding this trouble, that if two transmitters B and B' are employed, each transmitting vibrations at a fixed frequency of the same order of magnitude as the other but differing from one another by an amount exceeding the maximum detectable frequency, and preferably exceeding the maximum detectable frequency by so great a degree as to be of a different order of magnitude therefrom, the effect of standing waves is substantially eliminated. The position of the null point of a standing wave pattern is determined by, among other things, the frequency thereof. If two appropriately related separate frequencies are employed, the microphone D can never be at the null point of both frequencies and consequently the microphone D is always in position to detect irrespective of the positioning of the objects in the room A or of the normal thermal variations therein. I prefer that the frequencies of the two transmitters be between 18 and 20 kc. per second and that they differ from one another by an amount on the order of 1 kc. per second, 1 kc. per second being of a truly different order of magnitude from the maximum detectable frequency difference of the detectable frequency differences of between about 3 and 180 cycles per second.

Figure 2:
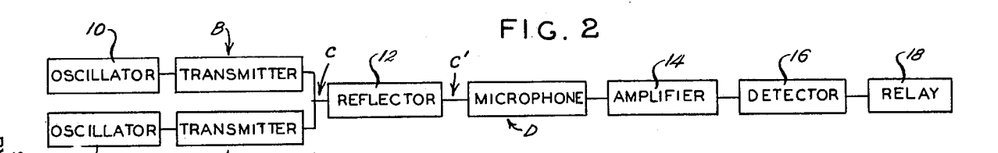
Fig. 2 is a block diagram illustrating the broad steps inherent in the method of the present invention when two transmitters are employed.

This system and the apparatus employed to effectuate it is shown in schematic form in the block diagram of Fig. 2. Two transmitters B and B' are employed each of which is controlled by a separate oscillator 10, 10' so that the waves C generated by the transmitter B will be sent out into the confined space A, there to impinge upon whatever air turbulence exists and to be reflected by whatever objects are contained therein as well as by the walls thereof. The waves C' leaving the reflecting object generally designated 12 are picked up by the microphone D which converts them into corresponding electrical fluctuations, these fluctuations being amplified in amplifier 14 and then sent out to a detector 16 where the frequencies of the received vibrations are compared in order to determine whether a frequency difference exists. This may be accomplished by combining all the received frequencies, if there be more than one frequency, and in therefore creating a beat frequency which will correspond to the difference between the frequencies. The thus detected frequency difference, if of sufficient magnitude and amplitude, will actuate relay 18 so as to set off any desired sort of sensible alarm.

The same effect may be obtained by eliminating entirely the use of an oscillator 10 and by connecting the microphone D and the transmitter B in regenerative fashion. This is illustrated in the block diagram of Fig. 9, in which the connection 11 connects the electrical output of amplifier 14, which amplifies the electrical output of the microphone D, to the electrical input of the transmitter B. Both the transmitter B and the microphone D have natural resonant frequencies in the supersonic range, that is to say, in the range at which transmission is desired. When the amplifier is energized and is made sufficiently strong to overcome the normal damping effects of the microphone D and the transmitter B, together with the damping effects of the air in the confined space, a free vibration will result in the desired supersonic range, the combined electrical circuits, mechanical elements, and air paths constituting an electro-mechanico-acoustical tuned circuit. As the condition of the air or the placement of the objects in the room changes, it may well be that the frequency of vibration will vary within small limits, but since the detector does not measure a particular frequency but only a difference between frequencies, the action of the detector will not be affected thereby and no matter what the precise frequency of vibration may be, the alarm will nevertheless be set off only upon motion of an intruder.

*Circuit construction*

TWO TRANSMITTERS

Figure 3:
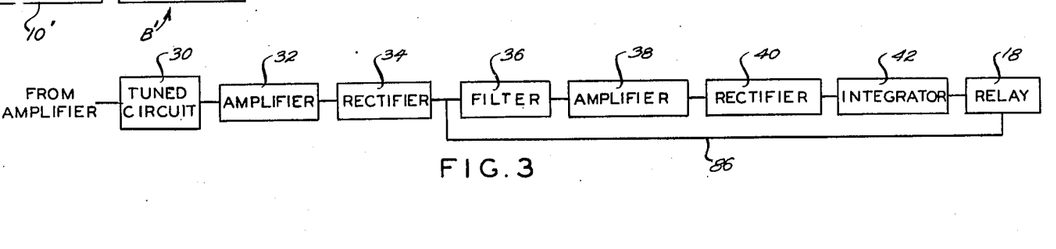
Fig. 3 is a block diagram illustrating the details of the detector step.
Figure 4:
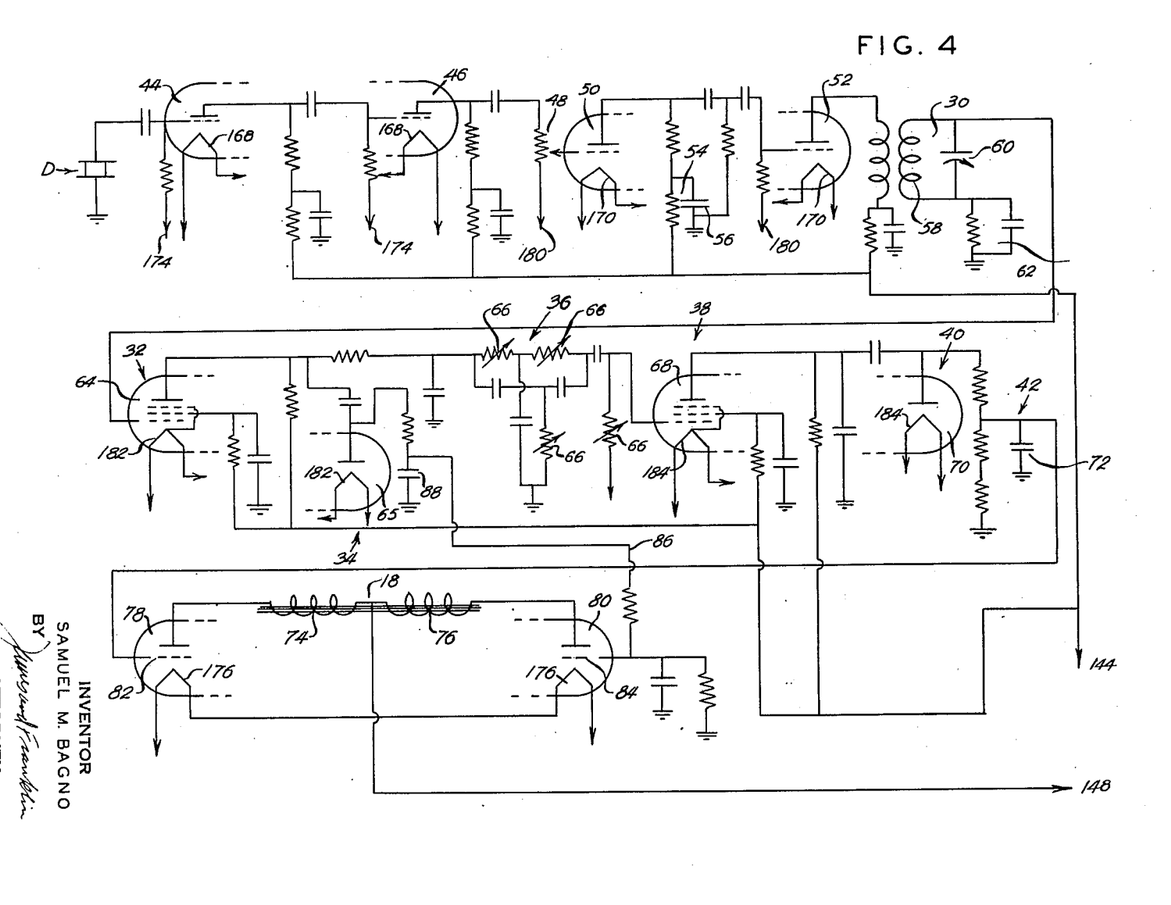
Fig. 4 is a circuit diagram showing the details of circuit design for the amplifier, detector, and relay when two transmitters are employed.
Figure 5:
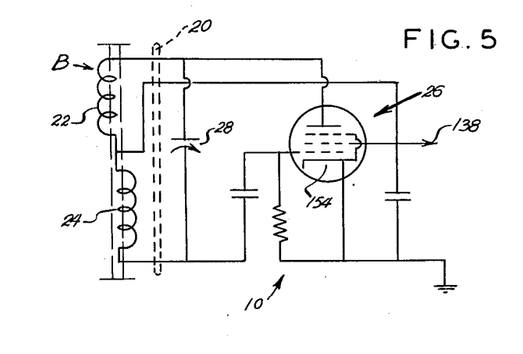
Fig. 5 is a circuit diagram typical of the transmitters employed in the present invention.

Taking first the embodiment of Figs. 2–5, in which two transmitters B and B' are employed, each of the transmitters and the oscillators 10 and 10' associated therewith may be identical and consequently a description of a single oscillator and a single transmitter will suffice for both. A typical circuit arrangement is illustrated in Fig. 5. Conventional loud speakers are ordinarily not capable of efficiently projecting vibrations at supersonic frequencies. Accordingly, I prefer to employ so-called magnetostriction transmitters which rely, for vibration of their diaphragms, upon the change of length of a magnetostriction rod 20 when subjected to varying magnetic field conditions. However, my invention is not to be limited to this specific type of transmitter. The variation in length of such magneto-striction rods is of a very small order of magnitude such as a few parts to a millionth of the length of the rod. However, if the rod be tuned to the frequency of transmission, it will resonate at that frequency and thus give rise to vibrations of considerably greater amplitude. Consequently, each transmitter B must contain a magnetostriction rod 20 tuned to the desired frequency of transmission. The magnetic fields of force active upon the rod 20 are provided by magnetostriction coils 22 and 24 which are here shown as connected to any suitable oscillator circuit generally designated 26. The frequency of oscillation of this vibrator circuit may be controlled by means of adjustable condenser 28. The details of the oscillator 10 and of the transmitter B may vary within wide limits as is well known to those skilled in the art, and their details form no part of the present invention.

The circuit construction of the detector 16, its connection with the relay 18, and its correlation with the various power sources therefore do, however, present many inventive features. The sequence of operations in the detector are shown in a schematic way in Fig. 3. The output from the amplifier, which consists of electrical fluctuations of frequencies corresponding to the sound waves received by the microphone D and thus having frequencies corresponding to the transmitted waves C and the reflected waves C', is fed to the tuned circuit 30 the output of which is still further amplified by amplifier 32 and then rectified by rectifier 34. If the sound waves received by the microphone D all have the same frequency, the output of the rectifier 34 will be constant. On the other hand, if the microphone D receives sound vibrations of differing frequencies, those two frequencies when combined in amplifier 14 will give rise to an output having a varying amplitude the frequency of which will correspond to the frequency difference between the received vibrations. Hence, the output of the rectifier 34 will vary in accordance with the frequency difference received by the microphone D, both as regards amplitude and frequency.

Since a pair of transmitters B are employed, each transmitting at a different frequency from one another by, say, 1 kc. per second, there will normally be present in the output of the amplifier 14 a beat having a frequency equal to 1 kc. per second. The output of rectifier 34 will fluctuate correspondingly. If, because of the motion of an intruder in the room A, the reflected waves C' differ in frequency from the transmitted waves C, there will be present in the output of the amplifier 14 a beat having a frequency corresponding to the speed of motion of the intruder, this beat having a frequency between, for example, 3 and 180 cycles per second. The output of the rectifier will vary accordingly.

This output is then fed to a filter circuit 36 so designed as to reject all frequencies below the desired minimum detectable frequency as well as those high frequencies corresponding to the difference between the two transmitted frequencies. In addition, the filter circuit is so designed that the minimum passable frequency may be controlled so that the sensitivity of the equipment to thermal disturbances and the like may be adjusted. Thus, the filter may be set to pass only frequencies above 3 cycles per second, in which case motion of an intruder at the rate of 2 inches per second will be detected but thermal disturbances other than those caused by a direct flame will not be detected. The minimum passable frequency might be set at a lower value, say, 2 cycles per second, in which case the apparatus will detect motion of an intruder at less than 2 inches per second, but would also detect thermal disturbances caused by, for example, a hot radiator. A minimum frequency of between 3 and 15 cycles per second has been found to be a safe value for an intruder alarm as distinguished from a fire alarm.

The output of the filter 36 is fed to amplifier 38 and is then rectified in rectifier 40. If the frequencies received by the microphone D are only those of the two transmitters B and B', the input to the rectifier 40 will be steady and consequently no output will result. This will be the situation when no intruder is present or when no excessive thermal disturbances obtain. However, if an intruder be moving, there will be an alternating current output from the filter 36 which can be rectified by the rectifier 40 and an output therefrom will result. This output is sent to an integrator 42 which permits the successive rectifications of the alternating current corresponding to the detected frequency difference to accumulate until their sum becomes strong enough to operate the relay 18 and thus set off an alarm of whatever nature is desired.

It will be noted from Fig. 3 that the output of rectifier 34 is also fed to relay 18. The purpose of this will become apparent upon consideration of the circuit diagram of Fig. 4. The microphone D which, for the frequencies under discussion is preferably of a crystal type, has its output connected to the grid of an amplifier tube 44 the output of which is reamplified by tube 46. As here illustrated, the two tubes are formed in a single envelope. The amplification accomplished is approximately 15 times per stage or a total of 225 times. The output from tube 46 goes to volume control 48 which is manually adjustable so as to determine the sensitivity of the apparatus to amplitude. It is this adjustment which permits the apparatus to be set up so as to be affected by a human but not, for example, by a rat or a mouse.

From the volume control 48 two more stages of amplification by tubes 50 and 52 are accomplished, the tubes 50 and 52 being here shown as contained in a single envelope similar to the tubes 44 and 46. Th output of tube 52 is connected in a self-biasing arrangement designated generally by the numeral 54 so that a signal strong enough to drive the grid positive will produce, by grid rectification, enough charge on the condenser 56 to effectively neutralize the positive peak of the signal. Hence, when the signal fluctuates in amplitude, as it will when different frequencies are received by the microphone D, the positive influence of the fluctuations will take place in a region where the grid of the tube is biased sufficiently negative due to the self-biasing arrangement 54 to make the plate of the tube respond to the fluctuations in a manner such that the percentage modulation of the signal leaving this stage in amplification is increased.

This signal is fed to a tuned circuit 30, here shown as comprising a capacitance 60 and an inductance 58 connected in parallel so as to form a parallel resonant circuit, the tuned circuit 30 being so tuned as to further amplify the modulated signal. A self-biasing arrangement 62, similar to the arrangement 54, further increases the percentage modulation of the signal fed to the final amplifier stage 32 represented by tube 64.

The output of the amplifier stage 32 is fed to rectifier 34 the output voltage of which follows the influence of the signal and consequently conforms to the beat frequency representing the difference between the frequencies received by the microphone D. This output is fed to filter 36 which may be a network formed of capacitances and resistors, the resistors 66 being adjustable so as to control the pass characteristics of the filter. It is by means of this adjustment that the minimum and maximum detectable frequencies of the apparatus may be varied, thus varying the minimum and maximum detectable speeds of motion and the minimum and maximum detectable thermal or air disturbances. The filter 36 will not pass frequencies on the order of 1 kc. and consequently the difference in frequency between the transmitters B and B' is blocked. The filter circuit 36 will however pass frequencies between 3 to 15 and 180 cycles per second and consequently those frequencies, corresponding to motion of an intruder or undue thermal or air disturbance, will pass to the amplifier stage 38 represented by tube 68 the output of which is fed to the rectifier stage 40 represented by tube 70. As here illustrated, the tubes 68 and 70 as well as the tubes 64 and 65 are enclosed in a single envelope.

If the only detected frequency difference is that between the two transmitters B and B', no signal will pass the filter 36. There will be no input to the amplifier 38, and there will consequently be no output from the rectifier 40. If, however, there is a frequency difference detected between, say, 3 and 180 cycles per second, an alternating current of that frequency will be passed by the filter 36, amplified by the amplifier 38 and rectified by the rectifier 40 so that an output will be obtained from the latter. As here illustrated, only half wave rectification is obtained and the rectified impulses are fed to an integrator 42 here shown as a condenser 72 which serves to accumulate the rectified impulses and build up a charge which is then fed to relay 18 so as to operate the same.

Relay connections

My relay and its manner of connection present many important inventive features. The relay 18 is composed of two opposed windings 74 and 76, a current through each being independently controlled by a separate tube 78 and 80 which for convenience may be combined into a single envelope. The output of the integrator 42 is connected to the grid 82 of tube 78. The grid 84 of tube 80 is connected by means of electrical connection 86 (see Figs. 3 and 4) to the condenser 88 which is in turn connected to the output of the rectifier 34. The condenser 88 acts as an integrator in the same manner as the condenser 72.

Whenever there is an output from the rectifier 34, which will be whenever both transmitters B and B' are operating and the tubes 44, 46, 50, 52, 64 and 65 are all functioning properly, the grid 84 of tube 80 will be so biased that no current will flow through the tube 80 and consequently no current will flow through the winding 76. Should any portion of the system before and including the condenser 88 fail, this negative bias will be removed from the grid 84 and current will flow through the tube 80 and the winding 76. The winding 76 is so wound in conjunction with the armature of the relay 18 that current flowing therethrough will cause the relay to trip and thus set off whatever alarm is desired. Consequently, upon failure of the apparatus, the alarm will be set off.

The tube 78 normally passes current, which current flows through the winding 74, thus tending to hold the relay out of its tripping position. The output of the rectifier 40 as integrated by the condenser 72, which output is present when a frequency difference corresponding to motion of an intruder is detected, puts a negative bias on the grid 82 of tube 78, thus cutting off current flow to the winding 74 and thus permitting the relay to trip and set off the alarm.

It will therefore be apparent that during normal operation of the apparatus, when no intruder is detected, current flows through winding 74 and no current flows through winding 76, the winding 74 being wound in a sense such as to keep the relay from tripping. When an intruder is detected, the current through winding 74 is cut off and the relay trips, setting off a sensible alarm. Should the apparatus fail (by apparatus is included the oscillator 10 and the transmitter B as well as the other elements thereof), there will be no bias on either of the grids 82 or 84 and consequently current will flow through both of the coils 74 and 76 but, since they are wound in opposed senses, they will neutralize one another and the relay will trip, setting off the alarm. By this arrangement, the apparatus is rendered relatively fool-proof; any tampering with it or disconnection or failure of any part will cause the alarm to be set off.

One transmitter

Figure 8:
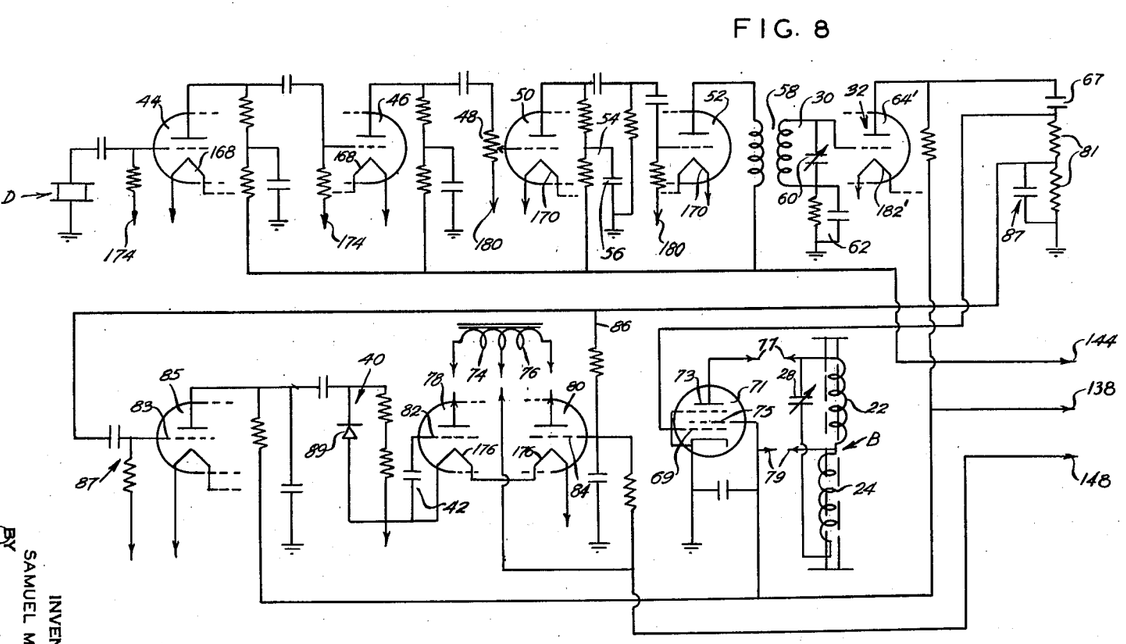
Fig. 8 is a circuit diagram showing the details of circuit design in the amplifier, detector and relay when only a single transmitter is employed.

The circuit diagram of Fig. 8 illustrates the connections employed in the regenerative system disclosed in schematic form in the block diagram of Fig. 9. Fig. 8 also discloses certain modifications applicable to the circuit of Fig. 4. All elements similar to those in Fig. 4 have been given similar designating numerals.

The signal received by the microphone D is amplified in much the same manner as was the case in the circuit previously discussed. The amplification tube 32, representing the final amplification stage before detection, is here shown as a triode tube 64' instead of as the pentode 64 of Fig. 4. The output of this amplification stage is connected by means of capacitance 67 to the grid 69 of the pentode 71 which acts as another amplifier, the plate 73 and the second grid 75 of the tube 71 being connected to the coils 22 and 24 of the transmitter B via contact points 77 and 79. An adjustable condenser 28 is connected in parallel with the coils 22 and 24 in order to tune the coils to approximately the desired frequency of vibration. This tuning, plus the natural resonant frequencies of the transmitter B and the microphone D together with the effect of the air in the space, enable the entire system to oscillate freely over the desired frequency range, thus ensuring that the frequencies of vibration are always such as to prevent the microphone D from being at a null point.

Certain other modifications illustrated in Fig. 8 disclose various methods of achieving rectification of the detection of the desired signal. As shown in Fig. 8, the output of the amplifier tube 64' is fed through a resistance-condenser arrangement comprising the capacitance 67 and the resistance 81 to ground. The voltage drop in the resistance 81 will vary with the envelope of the signal and therefore follow any fluctuations due to the moving object. This voltage is tapped off at an appropriate point and led to the grid 83 of the amplifying triode 85. (The two triodes 64' and 85 may, as illustrated, be enclosed within a single envelope.) Consequently, the voltage on the grid 83 will vary with fluctuations due to moving objects. A resistance-condenser arrangement generally designated 87 filters out the supersonic components before the voltage reaches the grid 83 and hence only those desired fluctuations affect the output of the tube 85, this output being rectified by rectifier 40, here shown in the form of a selenium cell rectifier 89, the output of which in turn feeds integrator 42 so as to control the bias on the grid 82 of the tube 78. The circuit diagram of Fig. 8 therefore illustrates the possibility of achieving rectification either by appropriately controlling the grid of the triode or by employing a selenium cell rectifier.

Power supply

Figures 6, 7:
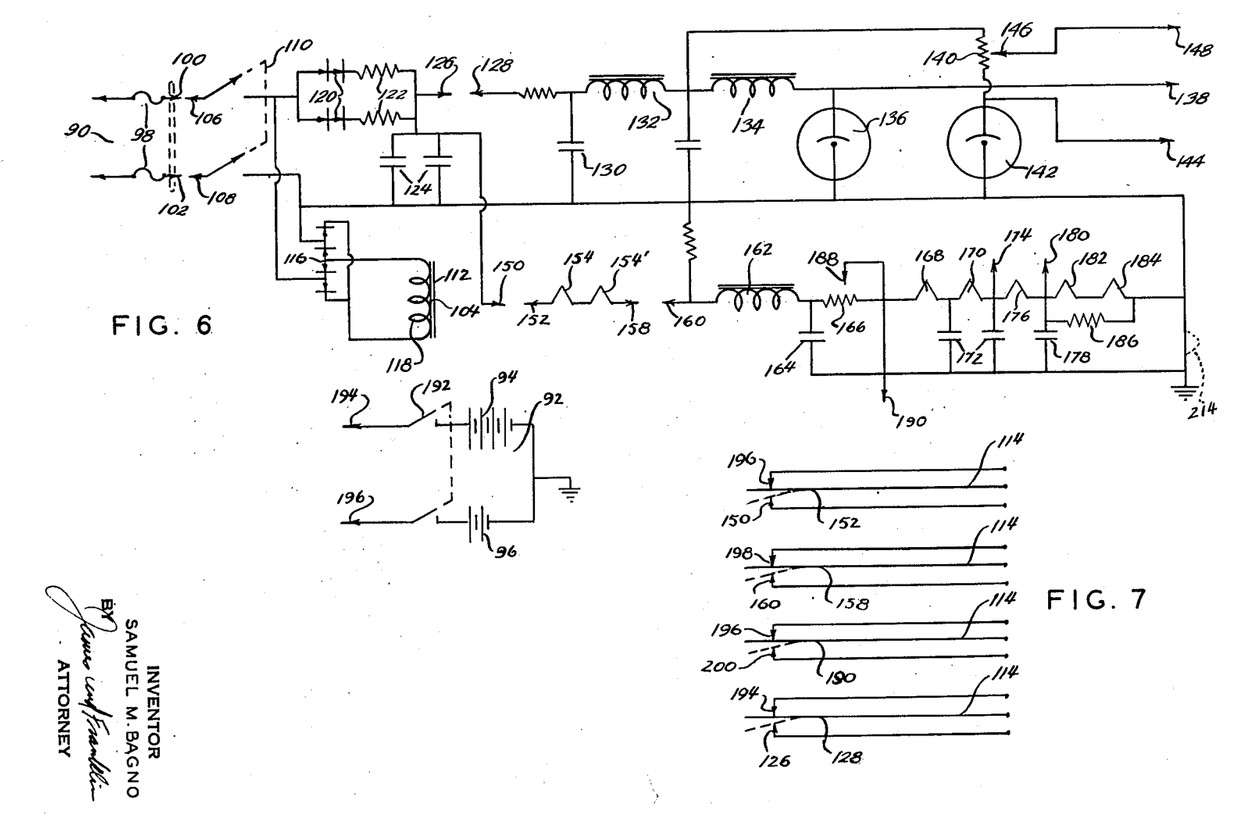
Fig. 6 is a circuit diagram of the power supply connections for the electrical apparatus of Figs. 4 and 5.
Fig. 7 is a schematic representation of the method of controlling the contacts of Fig. 6 so as to shift the power supply from main to auxiliary power source upon failure of the main power source.

The power supply for the apparatus is shown in Fig. 6 and is there illustrated as being adapted for use with a primary power source of alternating current 90 and a secondary power source of direct current 92, the latter comprising a B-battery 94 of approximately 135 volts and an A-battery 96 of approximately 12 volts. The alternating current source 90 may comprise a 110 volt source, such as is commonly found in industrial and residential locations, which leads to fuses 98 and to contact points 100 and 102, these points being connectable to points 106 and 108. An on-off switch 110 is provided so that the apparatus may be turned off while the room A is occupied but may be turned on when it is desired that the apparatus operate to detect an intruder. The relay 104 is connected across the alternating current line and is provided with an armature 112 which controls the contact making blades 114 illustrated in Fig. 7. Selenium rectifiers 116 are interposed between the coil 118 of the relay 104 and the alternating current source 90 so that uni-directional current passes through the coil 118 in an amount determined by the magnitude of the alternating current or primary power source 90. So long as that magnitude exceeds a certain critical amount, the contact blades 114 will take up their position illustrated in broken lines in Fig. 7, so as to cause the apparatus to be energized by the alternating current source 90. This source is connected to the apparatus via selenium rectifiers 120 each having a protective resistor 122, the rectifiers charging electrolytic condensers 124 which, through the relay contacts 126 and 128, charge another electrolytic condenser 130. A filter system generally designated 132 follows to smooth ripples in the rectifier output. From here the power supply is divided into two sections, one comprising a choke coil 134 in series with a voltage regulator tube 136 which supplies voltage at a point designated 138 for the oscillator 26. The other section consists of a resistor 140 and a voltage regulator tube 142 which supplies voltage for the input audio amplifier stages at point 144. The resistor 140 is tapped by means of movable connector 146 which supplies voltage to point 148 and thence to the tubes 78 and 80 via the relay windings 74 and 76.

Also leading from the condensers 124 across the input is a circuit comprising contacts 150 and 152, in series with which are the filaments 154 and 154' for the tubes of the oscillator 26. From here the electrical circuit goes through contact points 158 and 160 and choke coil 162 to another filter condenser 164 and through resistor 166 to the filaments 168 and 170 of tubes 44, 46, 50 and 52, each of these filaments being protected by means of by-pass condensers 172. Point 174 is connected to the corresponding points 174 in Fig. 4. The filament 176 for the relay tubes 78 and 80 is next in line and is also provided with a by-pass condenser 178 and point 180 is connected to the corresponding points 180 of Fig. 4. The filaments 182 and 184 for tubes 64 and 65 and tubes 68 and 70 respectively are next in line, these being provided with by-pass resistor 186. The resistor 166 is provided with movable tap 188 which leads to contact point 190.

The direct current supply 92 is provided with an individual on-off switch 192 which is normally closed and the high potential sides of the B and A batteries 94 and 96 lead to contact points 194 and 196. The relay contact point 198 is connected to ground and the contact point 200 has no connection.

*Power supply shifting*

Reference to Fig. 7 will illustrate the manner in which the relay 104 controls the effective power source. As has already been explained, so long as the primary alternating current source 90 has a sufficient magnitude, the rectified current through the coil 118 will be sufficient to maintain the armature 112 thereof in such a position as to force the contact blades 114 to their position shown in broken lines in Fig. 7. This will connect, reading from top to bottom in Fig. 7, contacts 150 and 152, contacts 158 and 160, and contacts 126 and 128. Contacts 190 and 200 also make connection, but contact 200 is unconnected to any part of the apparatus. Should the alernating current supply 90 fail, the relay will assume a position such that the blades 114 will take up their position illustrated by the solid lines in Fig. 7. When this occurs, contact 152 will be connected to the high potential side of the A-battery 96 via contact 196 and the circuit to the filaments 154 and 154' will be completed through contact 158 and contact 198 to ground. Contact 190 will also be connected to the positive side of the A-battery 96 via contact 196 and thus current will be supplied for the filaments 168, 170, 176, 182 and 184 and voltage will be provided to points 174 and 180.

Contact 128 will be connected to positive side of the B-battery 94 via contact 194 and consequently voltage will be supplied to the points 138, 144 and 148.

By this arrangement, it will be apparent that the apparatus is made independent of the failure of the power supply to the room A and consequently unauthorized tampering with that power supply will not result in rendering the alarm mechanism useless.

Figure 10:
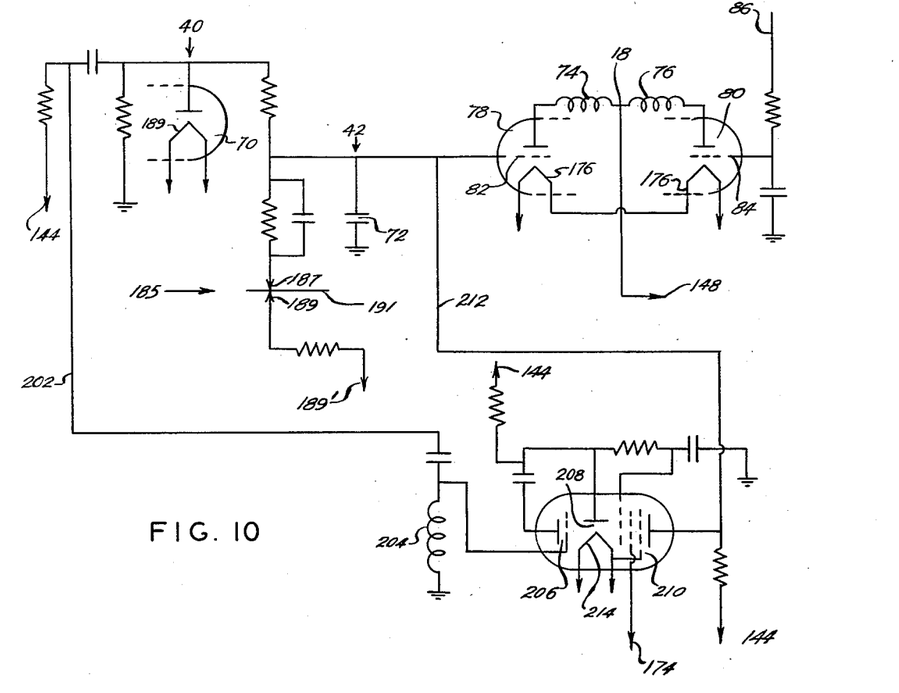
Fig. 10 is a circuit diagram illustrating certain circuit modifications adapted to decrease the effect of shock sounds upon the apparatus and to increase the efficacy of the shift from one power source to another.

If the switch from one power source to another is not rapid enough, it is possible that the effect on the grid 82 of the tube 78 may be such as to cause the relay to trip and thus sound the alarm. In order to prevent this, the mechanism generally designated 185 in Fig. 10 is provided. This mechanism includes a pair of contact points 187 and 189 with a movable contact blade 191 positioned therebetween, this blade being controlled by the armature 112 of the relay 104 in a manner similar to the controlling of the switch blades 114 of Fig. 7. The contact 189 is connected at 189' to a D. C. bias source and the contact 187 is connected to the grid 82. Blade 191 and the contacts 187 and 189 are so arranged that the blade 191 makes simultaneous electrical connection with the contacts 187 and 189 when the blade 191 is in its mid position. When the blade 191 is in either of its extreme positions, it separates the two contacts 187 and 189 so as to break connection between the D. C. bias source and the grid 82. The blade 191 will be in its mid position, making electrical connection, only during the shift from one power source to another; when the shift has been completed, the blade 191 will be in either one of its extreme positions. Consequently, during the shift, the blade 191 ensures that a positive bias is applied to the grid 82 so that current will flow through the winding 74 of the relay 18 and thus prevent the relay from tripping and sounding the alarm. Once the shift from one power source to another has been accomplished, blade 191 breaks electrical connection between the grid 82 and the D. C. bias source and consequently places the apparatus once again in operating condition.

The adjustable tap 146 on the resistor 140 is provided so as to make the output of the relay controlling tubes 78 and 80 relatively independent of the variations in line voltage. Such variations would affect the voltages of the filament 176 and the respective plates of tubes 78 and 80. By properly adjusting the tap 146, the proportionality of the variations in the voltages of the plates and filaments may be so controlled that, within the limits of the variation expected in the power source, the potential difference between the plates and the filaments will remain constant despite variations in the power source. Since it is this potential difference and not the absolute values of potential which determine the magnitude of the current flowing through the tubes 78 and 80 when they are not biased to cut off, it will be apparent that the current flow through those tubes is made substantially constant.

*Elimination of shock sounds*

I have found that a frequent source of false alarms is the presence of shock sounds in the enclosure. These sounds may be caused, for example, by a hammer blow in an adjacent room. Iron pipes and radiators or the glass in windows, for example, will carry the sound of that shock blow into the room being guarded by the apparatus. Such a blow is composed of a large number of frequencies among which are frequencies of an order of magnitude capable of setting off the alarm, that is to say, frequencies between, for example, 3 and 180 cycles per second removed from the supersonic carrier frequencies. These frequencies will be termed "intruder frequencies." Unless some means be found for neutralizing these detectable frequencies, arising from shock sounds, the incidence of false alarms may be too great.

These shock sounds not only contain intruder frequencies but also contain frequencies removed further from the supersonic carrier frequency, say on the order of 200 to 700 cycles per second. These latter frequencies are not present in the case of motion of an intruder or acceleration of air. I have therefore found that by utilizing these frequencies higher than the intruder frequencies to neutralize the intruder frequencies present in shock sounds, I can prevent shock sounds from setting off false alarms.

A circuit for accomplishing this is shown in Fig. 10 which shows a portion of the circuit of Fig. 4 with the shock sound neutralizing circuit added thereto. Those parts of the circuit of Fig. 10 identical with the circuit of Fig. 4 have been given similar numerical designations to those employed in Fig. 4.

Having reference to Fig. 10, it will be remembered that the beat frequencies which reach the rectifier 40 have already been filtered and consequently do not contain frequencies on the order of 1 kc. per second, the beat frequency between the two transmitters B and B', nor do they contain beat frequencies below, say, 3 cycles per second. They do contain all beat frequencies between these values. Should a true intruder be moving, intruder frequencies will be present and these will set off the alarm. No higher frequencies will be present. Should, however, a shock sound be detected, there will be present not only intruder frequencies but also frequencies considerably higher such as those between 200 and 700 cycles per second.

A tap 202 is provided at this point which leads to a circuit 204 which is tuned to resonate at these higher unwanted frequencies. The unwanted frequencies will therefore pass to the circuit 204 and will not pass to the rectifier 70. These frequencies are amplified by amplifier tube 206, rectified by diode 208, reamplified by tube 210 and then sent, via connection 212, to the integrator 42 in such a way as to be opposite in sense to the output of the integrator 42 (that is to say, positive) and sufficient in magnitude so as to neutralize whatever negative bias may tend to be built up in the condenser 72 by those components of the shock sound within the intruder frequency range. All of these tubes are illustrated in a single envelope, their common filament 214 being connected in the power supply as indicated by the broken lines of Fig. 6.

Consequently, when shock sounds are received, that portion of the shock sound within the intruder frequency range will be neutralized by those components of the shock sound having higher frequencies and the alarm will not be set off. Motion of an intruder or acceleration of air will give rise to intruder frequencies but will not give rise to frequencies in the neutralizing range and consequently the alarm will be set off. In this way, my apparatus is rendered capable of discriminating between true intruder motion and false vibrations which include vibrations of intruder frequencies and higher frequencies.

*Conclusion*

By the method and apparatus above described, I have provided a detection means utilizing high frequency vibrations of supersonic and near supersonic frequencies which is susceptible of many uses. It may be employed to signal the presence of intruders by detecting their motion and to this end it may be made so sensitive that even the slowest of human motions will set off the alarm. It may be so adjusted as to signal only the presence of intruders of human size, thus permitting the existence of animals in a room to be guarded, or it may be made so sensitive as to signal the presence even of an unauthorized mouse. The apparatus may be adjusted so as to function as a fire alarm by detecting excess thermal disturbances or it may be made so sensitive as to detect even the heating of a radiator. By means of manually settable adjustments, any installation can be varied at will to correspond to the desired degree of detectability, both as regards degrees of motion of air or thermal disturbance and as regards the magnitude of the disturbance to be detected, that is to say, the size of the intruder which will set off the alarm.

The method employed is independent of the positioning of the various objects in the room and is not affected by normal thermal variations because it does not depend upon placing the microphone D at a null point of a standing wave pattern but instead avoids such a positioning by employing a pair of transmitters B and B' each transmitting at a separate frequency so that the microphone D can never be at a null point for both generated frequencies or by regeneratively connecting the microphone and transmitter.

The circuit arrangement of the apparatus is such as not only to render it adjustable in the manner above described, but to render it substantially tamper and fool-proof as well because, should any element of the apparatus fail, either because it is worn out or because a would-be intruder has sought to put it out of action, the relay 18 will set off the alarm, thus drawing attention to the fact that the apparatus is no longer in condition to perform its desired function. In addition, a primary and a secondary power source are both employed, the apparatus shifting from primary to secondary whenever the primary fails. The output of the apparatus which controls the relay is also made substantially independent of the variations in the voltage source so that even if the primary source should fluctuate but not fall below that critical point which will call the secondary source into operation, the apparatus will nevertheless function normally. The fool-proof nature of my method and apparatus may be enhanced and its susceptibility to giving false alarms when shock sounds are received thereby may be destroyed by utilizing those frequencies of the shock sound above the intruder frequencies to neutralize the shock sound components of the intruder frequencies.

I have here illustrated my method and apparatus in a single specific form but it will be obvious that many variations may be made therein without departing from the spirit of the invention as defined in the following claims.

I claim:

1. The method of indicating motion within an enclosure which comprises: providing a source of energy of a given high frequency; radiating said energy into a room to fill substantially all parts of said room with said energy; providing within said room a receiver for receiving said energy; orienting said source and said receiver with respect to each other and with respect to the walls of said room so that said receiver receives from a multitude of directions energy which has been reflected from walls and objects in the room, said received energy including a substantial component of energy which has been reflected a plurality of times whereby motion of a reflecting object within said room causes small frequency deviations of a portion only of said received energy; detecting frequency changes in said portion of said received energy; and indicating motion in accordance with said detected frequency changes.

2. The method of indicating motion within an enclosure which comprises: providing a source of energy of a given high frequency; radiating said energy into a room to fill substantially all parts of said room with said energy; providing within said room a receiver for receiving said energy; orienting said source and said receiver with respect to each other and to the walls of said room so that said receiver receives substantially only energy which has been reflected from walls and from objects in the room and said energy includes a major component of energy which has been reflected a plurality of times whereby motion of a reflecting object within said room causes small frequency deviations of a portion only of said received energy; detecting frequency changes in said portion of said received energy; and indicating motion in accordance with said detected frequency changes.

3. The method of indicating motion within an enclosure which comprises: providing a source of energy of a given high frequency; radiating continuously said energy into a room to fill substantially all parts of said room with said energy; providing within said room a receiver for continuously receiving said energy; orienting said source and said receiver with respect to each other and with respect to the walls of said room so that said receiver receives substantially only energy which has been reflected from walls and from objects in the room and said received energy includes a major component of energy which has been reflected a plurality of times whereby motion of a reflecting object within said room causes small frequency deviations of a portion only of said received energy; detecting frequency changes in said portion of said received energy; and indicating motion in accordance with said detected frequency changes.

4. The method of indicating motion within an enclosure which comprises: providing a transmitter of energy of a given high frequency; radiating continuously said energy into a room to fill substantially all parts of said room with said energy; providing within said room a receiver spaced apart and separate from said transmitter for continuously receiving said energy; orienting said transmitter and said receiver with respect to each other and with respect to the walls of said room so that said receiver receives substantially only energy which has been reflected from walls and from objects in the room and said received energy includes a major component of energy which has been reflected a plurality of times whereby motion of a reflecting object within said room causes small frequency deviations of a portion only of said received energy; detecting frequency changes in said portion of said received energy; and indicating motion in accordance with said detected frequency changes.

5. The method of indicating motion within an enclosure which comprises: providing a transmitter of energy of a given high frequency; radiating said energy into a room to fill substantially all parts of said room with said energy; providing within said room a receiver for receiving said energy; orienting said transmitter and said receiver with respect to each other and with respect to the walls of said room so that said receiver receives energy which has been radiated into said room and reflected from walls and objects in the room, said received energy including components which collectively have traversed paths covering the protected area of said room, whereby motion of a reflecting object within said protected area causes small frequency deviations of a portion of said received energy; detecting frequency changes in said portion of said received energy; and indicating motion in accordance with said detected frequency changes.

6. The method of indicating motion within an enclosure which comprises: providing a transmitter of energy of a given high frequency; radiating said energy into a room to fill substantially all parts of said room with said energy; providing within said room a receiver for receiving said energy; orienting said transmitter and said receiver with respect to each other and with respect to the walls of said room so that said receiver receives energy which has been radiated into said room and reflected from walls and objects in the room, said received energy including components which collectively have traversed paths covering the protected area of said room, whereby motion of a reflecting object within said protected area causes small frequency deviations of a portion of said received energy; so relating the transmission of said energy to the reception thereof as to ensure that said reception never takes place at a null point on a standing wave pattern; detecting frequency changes in said portion of said received energy; and indicating motion in accordance with said detected frequency changes.

7. The method of indicating motion within an enclosure which comprises: providing a transmitter of energy of a given high frequency; providing a transmitter of energy of a different high frequency; radiating said energy of both frequencies into a room to fill substantially all parts of said room with energy of both frequencies; providing within said room a receiver for receiving said energy; orienting said transmitter and said receiver with respect to each other and with respect to the walls of said room so that said receiver receives energy which has been radiated into said room and reflected from walls and objects in the room, said received energy including components of each frequency which collectively for each frequency have traversed paths covering the protected area of said room, whereby motion of a reflecting object within said protected area causes small frequency deviations of a portion of said received energy; detecting frequency changes in said portion of said received energy; and indicating motion in accordance with said detected frequency changes.

8. The method of claim 7, in which the transmitted energy frequencies differ from one another by an amount of a different order of magnitude from the detected frequency change in said portion of said received energy which gives rise to the indication of motion.

9. The method of claim 7, in which the transmitted energy frequencies are both on the order of 20 kc. per second, in which the transmitted energy frequencies differ from one another by an amount on the order of 1 kc. per second, and in which the minimum frequency change in said portion of said received energy which gives rise to the indication of motion above 3 cycles per second.

10. The method of indicating motion within an enclosure which comprises: providing a transmitter of energy of a given high frequency; providing within said room a receiver for receiving said energy, said receiver being electrically connected to said transmitter by means of an amplifier and being radiationally connected with said transmitter by means of the space within said room, the transmitter and receiver having natural frequencies of vibration within a range equal to that of a desired frequency range of radiated energy; energizing the electrical circuit thus formed so as to cause the radiation into said room of energy of a given high frequency within said desired frequency range so as to fill substantially all parts of said room with said energy; orienting said transmitter and said receiver with respect to each other and with respect to the walls of said room so that said receiver receives energy which has been radiated into said room and reflected from walls and objects in the room, said received energy including components which collectively have traversed paths covering the protected area of said room, whereby motion of a reflecting object within said protected area causes small frequency deviations of a portion of said received energy; detecting frequency changes in said portion of said received energy; and indicating motion in accordance with said detected frequency changes.

11. The method of detecting fire or other excess thermal disturbance in a space to be protected which comprises generating vibrations of a predetermined frequency, radiating said vibrations into said space to be protected so as to pass through substantially all of said space, whereby said vibrations will impinge upon the air turbulence or flame attendant upon a thermal disturbance, if present, in said space to be protected, said air turbulence or flame causing frequency deviations from the transmitted frequency, receiving the resultant vibrations, comparing the frequencies of the generated and received vibrations, and actuating a sensible alarm in accordance with the detection of predetermined differences in said frequencies, if present.

12. The method of claim 11, in which said alarm is actuated only in accordance with the detection of predetermined differences above three cycles per second in said frequencies.

13. The method of detecting fire or other existing thermal disturbances in a confined space which comprises: providing a transmitter of energy of a given high frequency; radiating said energy into a room so as to fill substantially all parts of said room with said energy; providing within said room a receiver for receiving said energy; orienting said transmitter and said receiver with respect to each other and with respect to the walls of said room so that said receiver receives energy reflected from walls and objects in the room, said received energy including components which collectively have traversed paths covering the protected area of said room, whereby said radiated energy will impinge upon the air turbulence or flame attendant upon a thermal disturbance, if present, in said protected area, said air turbulence or flame causing frequency deviations of a portion of said received energy; detecting frequency changes in said portion of said received energy; and indicating the existence of a thermal disturbance in accordance with said detected frequency changes.

14. The method of claim 13, in which said alarm is actuated only in accordance with the detection of frequency changes in said portion of said received energy above three cycles per second.

15. Apparatus for detecting motion in a confined space comprising means for generating energy of a given high frequency, means for radiating said energy into a room so as to fill substantially all parts of said room with said energy; means within said room for receiving said energy, said radiating and said receiving means being oriented with respect to each other and with respect to the walls of said room so that said receiver receives energy which has been radiated into said room and reflected from walls and objects in the room, said received energy including components which collectively have traversed paths covering the protected area of said room, whereby motion of a reflecting object within said protected area causes small frequency deviations of a portion of said received energy; means for detecting changes in the frequency of said portion of said received energy; switch means for controlling a sensible alarm; and means for actuating said switch means when the amplitude and frequency of said detected frequency change exceeds predetermined amounts.

16. In the apparatus of claim 15, means for varying the minimum acceptable frequency change capable of actuating said switch means.

17. In the apparatus of claim 15, means for controllably modifying said detecting means so as to vary the minimum acceptable frequency change capable of actuating said switch means.

18. Apparatus for detecting motion in a confined space comprising: means for generating energy of a given high frequency; means for radiating said energy into a room so as to fill substantially all parts of said room with said energy; means within said room for receiving said energy, said radiating and said receiving means being oriented with respect to each other and with respect to the walls of said room so that said receiver receives energy which has been radiated into said room and reflected from walls and objects in the room, said received energy including components which collectively have traversed paths covering the protected area of said room, whereby motion of a reflecting object within said protected area causes small frequency deviations of a portion of said received energy, the radiation of said energy being so related to the reception thereof as to ensure that said reception never takes place at a null point on a standing wave path; means for detecting changes in the frequency of said portion of said received energy; switch means for controlling a sensible alarm and means for actuating said switch means when the amplitude and frequency of said detected frequency change exceeds predetermined amounts.

19. Apparatus for detecting motion in a confined space comprising: means for generating energy of a given high frequency; means for generating energy of a different high frequency; means for radiating said energy of both frequencies into a room to fill substantially all parts of said room with energy of both frequencies; means in said room for receiving said energy, said radiating means and said receiving means being oriented with respect to each other and with respect to the walls of said room so that said receiver receives energy which has been radiated into said room and reflected from walls and objects in the room, said received energy including components of each frequency which collectively for each frequency have traversed paths covering the protected area of said room, whereby motion of a reflecting object within said protected area causes small frequency deviations of a portion of said received energy; means for detecting frequency changes in said portion of said received energy; switch means for controlling a sensible alarm; and means for actuating said switch means when the amplitude and frequency of said detected frequency change exceeds predetermined amounts.

20. The apparatus of claim 19, in which the radiated energy frequencies differ from one another by an amount of a different order of magnitude from the detected frequency change in said portion of said received energy which actuates said switch means.

21. The apparatus of claim 19, in which the transmitted energy frequency are both on the order of 20 kc. per second, in which the transmitted energy frequencies differ from one another by an amount on the order of 1 kc. per second, and in which the minimum frequency change in said portion of said received energy which gives rise to the actuation of said switch means is above three cycles per second.

22. Apparatus for indicating motion within an enclosure which comprises means for generating energy of a given high frequency; means for radiating said energy into a room, means within said room for receiving said energy; electrical connections between said radiating means and said receiving means including an amplifier, said radiating means and said receiving means being radiationally connected with one another by means of the space within said room, said radiating means and said receiving means having natural frequencies of vibration comparable to that of the generated energy; means for energizing the electrical circuit thus formed so as to cause the radiation into said room of energy of a given high frequency so as to fill substantially all parts of said room with said energy, said radiating means and said receiving means being oriented with respect to each other and with respect to the walls of said room so that said receiving means receives energy which has been radiated into said room and reflected from walls and objects in the room, said received energy including components which collectively have traversed paths covering the protected area of said room, whereby motion of a reflecting object within said protected area causes small frequency deviations of a portion of said received energy; means for detecting frequency changes in said portion of said received energy; switch means for controlling a sensible alarm; and means for actuating said switch means when the amplitude and frequency of said detected frequency change exceeds predetermined amounts.

23. In the apparatus of claim 15, means operatively connected to said detecting means and effective to distinguish between and separate detected frequency changes in said portion of said received energy which have an order of magnitude which will actuate said switch means and detected frequency changes having a different order of magnitude, and means for causing said two frequencies to neutralize one another.

24. The method of claim 5, in which said given high frequency is on the order of 20 kc. per second, and in which the minimum detected frequency change in said portion of said received energy which will indicate motion is above 3 cycles per second.

25. The method of claim 5, in which the minimum detected frequency change in said portion of said received energy which will detect motion is above 3 cycles per second.

SAMUEL M. BAGNO.

References Cited in the file of this patent

UNITED STATES PATENTS

| Number | Name | Date |
| --- | --- | --- |
| 1,471,547 | Chilowsky et al. | Oct. 23, 1923 |
| 1,785,307 | Hammond | Dec. 16, 1930 |
| 1,864,638 | Chilowsky | June 28, 1932 |
| 2,071,933 | Miessner | Feb. 23, 1937 |
| 2,078,175 | Grant | Apr. 20, 1937 |
| 2,176,742 | La Pierre | Oct. 17, 1939 |
| 2,177,061 | Gerhard | Oct. 24, 1939 |
| 2,197,028 | Wolff | Apr. 16, 1940 |
| 2,247,246 | Lindsay et al. | June 24, 1941 |
| 2,253,975 | Guanella | Aug. 26, 1941 |
| 2,325,902 | Bauer | Aug. 13, 1943 |
| 2,386,942 | Edelman | Oct. 16, 1945 |
| 2,400,309 | Kock | May 14, 1946 |
| 2,416,922 | Irish et al. | Mar. 4, 1947 |
| 2,428,290 | Peck | Sept. 30, 1947 |